Patented Oct. 5, 1943

2,330,979

UNITED STATES PATENT OFFICE 2,330,979

CYCLOPROPYL ETHER AND METHOD OF PREPARING SAME

John C. Krantz, Jr., Baltimore, and Nathan L. Drake, College Park, Md.

No Drawing. Application January 9, 1940, Serial No. 313,118

7 Claims. (Cl. 260—611)

This invention relates to cyclopropyl ethers and to the preparation of such compounds. It is particularly concerned with cyclopropyl methyl ether and its preparation for therapeutic uses.

The present invention deals with a series of new organic compounds and with methods for their production. The compounds contemplated by this invention are characterized by having the general formula R—O—R', where R is any cyclopropyl, or substituted cyclopropyl radical and R' is any saturated or unsaturated hydrocarbon radical.

The following examples illustrate different types of compounds included within the series of compounds contemplated by the present invention.

Compounds of the general formula in which R is a simple cyclopropyl radical and in which R' is, respectively, a saturated hydrocarbon radical, and an unsaturated hydrocarbon radical are as follows:

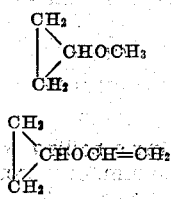

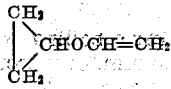

Compounds of the general formula in which R is a simple cyclopropyl radical and R' is a cyclic or heterocyclic radical, are as follows:

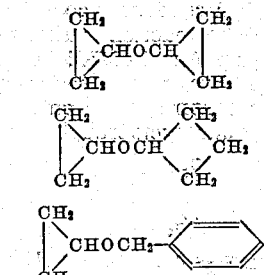

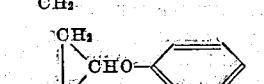

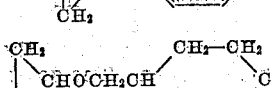

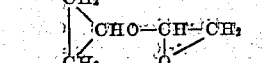

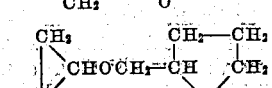

Compounds of the general formula in which R is, respectively, a simple, and a mixed, substituted cyclopropyl radical and R' may be any hydrocarbon radical, are typified as follows:

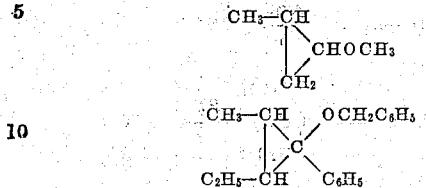

Compounds of the general formula in which R' is an unsaturated hydrocarbon radical, are typified as follows:

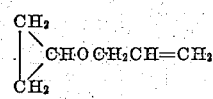

The foregoing examples are intended merely to be illustrative of the many and various compounds contemplated by the present invention and are not to be understood as defining the scope of the invention.

We believe that the cyclopropyl ethers of the present invention are new and that the various ethers contemplated have many and varied uses.

One ether which we have found to be quite useful as an anesthetic is cyclopropyl methyl ether of the formula

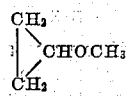

As a result of the use of this compound in preliminary anesthesia experiments on dogs, monkeys and mice, it appears that this compound is safe and does not create undue excitement or produce ill effects. These experiments indicate that the duration of the anesthesia, after the source of the drug is removed, is longer as compared with other anesthetics, such as diethyl ether and cyclopropane. A smaller concentration in the inspired air is required than is the case with cyclopropane and about the same concentration is required as with diethyl ether. Cyclopropyl methyl ether boils at about 19° F. higher than ethyl ether. This property is desirable, particularly where the ether is to be used in tropical climates, because the higher boiling point lowers the rate of evaporation at room temperature and thus does not chill the air inhaled by the patient during anesthesia as much as do the lower boiling compounds. Pulmonary irritation is reduced when chilling of the air inhaled by the patient is reduced. The lower volatility of cyclopropyl methyl ether apparently increases the duration of anesthesia after the source of the drug is removed, probably because of an increase in the period of elimination. Altho cyclopropyl methyl ether is a liquid at room temperature, it appears to possess the anesthetic properties of cyclopropane without possessing the undesirable characteristics of the latter.

The general method of preparing the intermediates necessary for the preparation of cyclopropyl ethers of, and according to, the present invention is indicated by the following general reaction:

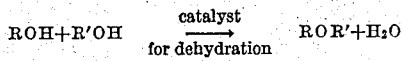

Catalysts such as $H_2SO_4$ or $Al_2O_3$ may be used.

Other methods of preparing these intermediates may be represented by the following reactions where X is the halogen and R is the desired radical.

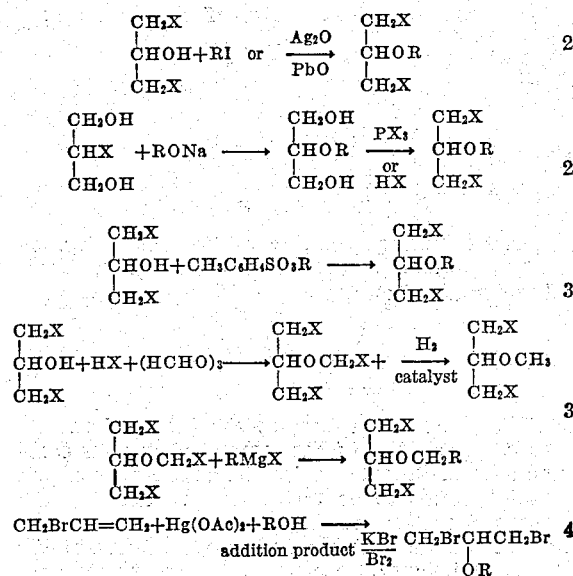

The intermediate

can be prepared with any or all of its hydrogens substituted with radicals to make possible the preparation of substituted-cyclopropyl ethers.

More specifically, cyclopropyl ethers of the present invention may be prepared as follows: Glycerine 1,3-dihalohydrin having the general formula

where X is halogen, may be obtained on the open market, where it is now available in the form of dibromo or dichloro compounds which are known as glycerine α,γ dibromhydrin and glycerine α,γ dichlorhydrin. This compound may be converted into a mixed ether by treating it with a dialkyl sulphate containing the hydrocarbon radical desired, as for example, by the following general reaction:

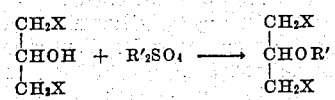

This mixed ether may be converted into the corresponding cyclopropyl ether by treatment in a suitable solvent containing a suitable metal and under suitable conditions of temperature, agitation and the like, as for example, by the following general reaction:

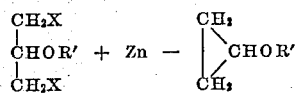

The present method of preparing cyclopropyl ethers of the present invention will be better understood by the somewhat detailed description of one manner of preparing cyclopropyl methyl ether which has been found to be satisfactory. About 1090 gms.

and 735 gms. $(CH_3)_2SO_4$ were heated under reflux at 100° C. for twelve hours. The reaction mixture was cooled to room temperature and poured into water containing a little ice. Solid $NaHCO_3$ was added until no further effervescence occurred. The lower layer which contained the desired product was then separated from the aqueous layer and the latter layer was discarded. The retained liquid was shaken with small quantities of 50 per cent. aqueous NaOH while the mixture was kept cool with tap water. The resulting aqueous layer was removed and discarded. The retained liquid was shaken with concentrated aqueous ammonia added in small quantities and the mixture was kept cool. The resulting aqueous layer was discarded. The retained liquid was washed with water and then dried over $MgSO_4$, placed in a flask with powdered $CaCO_3$ and fractionated. The resulting yield of

was 360 gms. having a boiling point of 46°–49° C. at a pressure of 1.5 mm. of mercury.

Two moles of $Na_2CO_3=212$ gms., four moles of $NaI=600$ gms., six moles of zinc dust=390 gms. and 400 gms. of $CH_3CONH_2$ were placed in a flask with a mercury sealed stirrer and an outlet tube leading to a spiral condenser cooled in solid $CO_2$ and $C_2H_5OH$. The reaction flask was heated to 120–125° C. Two moles of $(CH_2Br)_2CHOCH_3=464$ gms. were added dropwise to the contents of the flask while the contents were efficiently stirred. The resulting crude cyclopropyl methyl ether,

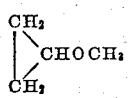

distilled off and was condensed. About 120 gms. of this crude ether were thus obtained.

A very dilute solution of this crude cyclopropyl ether in $CCl_4$ was made, cooled in ice water and titrated with 0.2 $NBr_2$ to determine the quantity of unsaturated impurities present in the ether. 0.205 mole of $Br_2$ per 72 gms. of the ether was taken up in this titration. The determination of unsaturates can also be carried out by perbenzoic acid titration. Then a quantity of $Br_2$ in excess of the amount required per mole of the product as shown by the titration was distilled over the crude ether while the latter was stirred and cooled in an ice water bath. The thus treated crude product was then fractionated and the fraction obtained between about 45° C. and about 47° C. was saved. This fraction was refluxed over powdered NaOH for a short time and then fractionated directly from the solid.

The cyclopropyl methyl ether resulting from the foregoing process was chemically pure and was suitable for anesthesia. It boiled at between about 45.2° C., and about 45.7° C., under atmospheric pressure. It had a density of about 0.7947 gm. per cc. at 25° C., had a surface tension at 25° C. of about 20.88 dynes per cm. and had a refractive index at 25° C. of about 1.3778.

It will be understood by those skilled in the art that the foregoing specifically described process for making cyclopropyl methyl ether may be varied somewhat. For example, the crude reaction mixture from the glycerine 1,3-dihalohydrin and alkyl sulphate may be treated with any suitable alkaline reagent other than $NaHCO_3$, such as aqueous ammonia or lime. Similarly the ether, after separation from the reaction mixture, may be dried over any suitable drying agent other than $MgSO_4$, such as $CaCl_2$ or $Na_2SO_4$.

Furthermore, the nature and amounts of substances used to convert such a halogen substituted ether into cyclopropyl ether may be varied. The $Na_2CO_3$ may be omitted or, if employed, may be used in amounts ranging from about 1 mole to about 0.1 mole. The NaI may be omitted but, if employed, may range from about 2 moles to about 0.001 mole. The zinc may range in amount from about 3 moles to about 1 mole and may be replaced by any other suitable metal such as sodium or magnesium. The acetamide, when employed, may range from about 3 moles to about 10 moles and may be replaced by other solvents such as diphenyl oxide, dibutyl ether, or diphenyl.

The unsaturated impurities may be removed from the crude cyclopropyl methyl ether by treating with reagents other than $Br_2$. For example, reagents which will add to a double bond more readily than they will react with a cyclopropyl ring may be used, such as $IBr_5$, $ICl_3$, IBr, ICl, $H_2$+suitable catalyst, perbenzoic acid or thiocyanogen. Traces of halogens or aldehydes may be removed by refluxing over a caustic alkali, such as KOH.

The foregoing specification, and particularly the specific detailed examples stated therein, will be sufficient to enable those skilled in the art to make other cyclopropyl ethers embodying the present invention and further examples are, therefore, believed to be unnecessary.

Having thus described the present invention so that those skilled in the art may understand and be able to practice the same, we state that what we desire to secure by Letters Patent is defined in what is claimed.

What is claimed is:

1. The method of making a cyclopropyl ether having the general formula R—O—R' where R is a cyclopropyl radical and R' is a hydrocarbon radical which includes the step of treating a mixed ether having the general formula $$\begin{array}{c} CH_2X \\ | \\ CHOR' \\ | \\ CH_2X \end{array}$$

where X is halogen and R' is the desired hydrocarbon radical with zinc in a solvent in amounts sufficient to produce the following reaction:

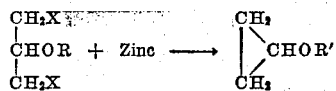

2. The method of making cyclopropyl ethers which includes the steps of reacting glycerine 1,3-dihalohydrin of the general formula $$\begin{array}{c} CH_2X \\ | \\ CHOH \\ | \\ CH_2X \end{array}$$

where X is halogen, with a dialkyl sulphate having the general formula $R'_2SO_4$, where $R'_2$ is the hydrocarbon radical desired in amounts sufficient to produce the general reaction

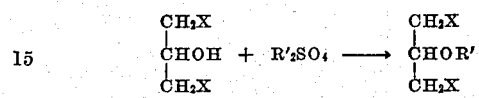

and then treating the resulting mixed ether with zinc in a solvent in amounts sufficient to produce the desired cyclopropyl ether by the general reaction

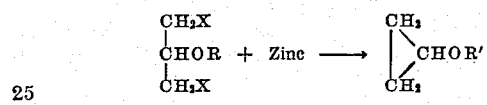

3. The method of making cyclopropyl methyl ether which includes the steps of reacting glycerine 1,3-dihalohydrin with an excess of dimethyl sulphate while heating at a temperature between about 90° C. and about 140° C. until equilibrium is reached, thereby bringing about substantially the following reaction:

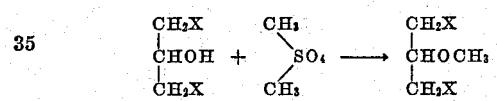

where X is halogen, bringing a quantity of the mixed ether resulting from said reaction dropwise into a sufficient quantity of acetamide, which is being stirred, which is at a temperature between about 100° C. and about 150° C. and which contains powdered zinc, to produce crude cyclopropyl methyl ether by the following reaction:

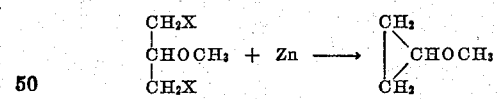

4. A cyclopropyl ether containing not over 6 carbon atoms and having the general formula R—O—R', where R is the cyclopryl radical and R' is an aliphatic hydrocarbon radical.

5. A cyclopropyl ether containing not over 6 carbon atoms and having the general formula R—O—R', where R is the cyclopropyl radical and R' is a saturated aliphatic hydrocarbon radical.

6. A cyclopropyl ether containing not over 6 carbon atoms and having the general formula R—O—R', where R is the cyclopropyl radical and R' is an unsaturated aliphatic hydrocarbon radical.

7. Cyclopropyl methyl ether having the formula $$\begin{array}{c} CH_2 \\ \diagdown \\ CHOCH_3 \\ \diagup \\ CH_2 \end{array}$$

JOHN C. KRANTZ, Jr.
NATHAN L. DRAKE.